Jan. 27, 1953 J. C. MOOMAW 2,626,546
TWO-WAY PLOW

Filed Feb. 24, 1947 2 SHEETS—SHEET 1

INVENTOR:-
JOHN C. MOOMAW
BY
ATTORNEYS

Jan. 27, 1953  J. C. MOOMAW  2,626,546
TWO-WAY PLOW
Filed Feb. 24, 1947  2 SHEETS—SHEET 2
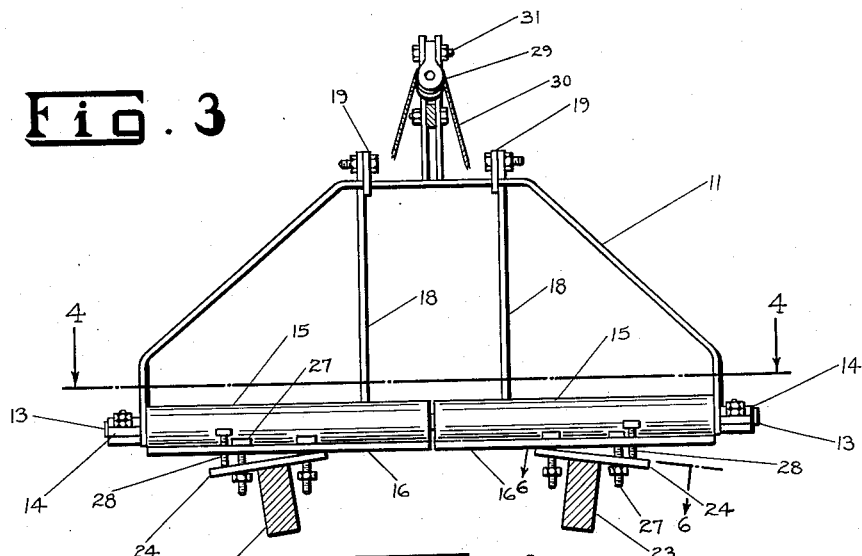
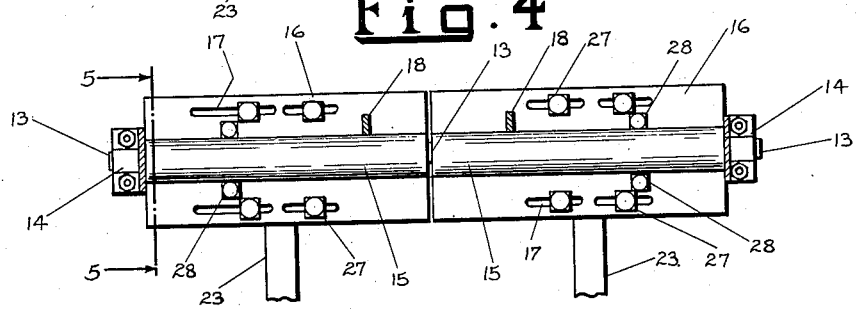
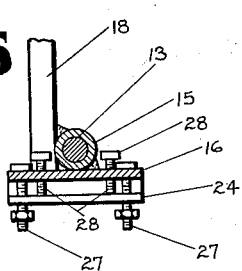 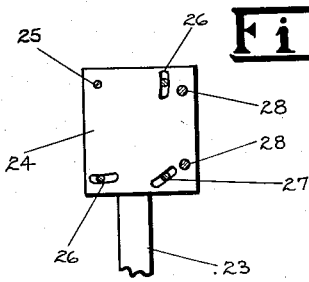
Inventor:-
JOHN C. MOOMAW
By Huebner, Maltby & Beehler
Attorneys Patented Jan. 27, 1953

2,626,546

UNITED STATES PATENT OFFICE 2,626,546

TWO-WAY PLOW

John C. Moomaw, La Verne, Calif., assignor to Alice Marian Mellen, Whittier, Calif.

Application February 24, 1947, Serial No. 730,277

2 Claims. (Cl. 97—29)

The present invention relates to cultivators and more particularly to an improved two-way plow.

In the care of farm lands, situations frequently arise in which it is desirable to plow to either or both sides as an agricultural implement is drawn on a given course. Such adaptability permits the plowing of a field in one direction as the implement is caused to traverse the field in reciprocal, parallel paths. The utility of such a plowing procedure is marked in contour plowing and many other cultivating operations. Further, in regions requiring irrigation, the ability to plow in two directions, either selectively or concurrently, is conducive to the expeditious formation of irrigation ditches, dikes, and the like.

Two-way plows are well known, but in conventional forms are characterized by certain unsatisfactory qualities which the present invention seeks to correct. Generally, conventional two-way plows have been easily maladjusted, insufficient latitude has been available in adjusting such plows to varied soils and plowing conditions encountered; automatic control features have been prone to fail under the strains of actual operation; and their somewhat complicated structures have not been conducive to simplicity and reliability of operation.

An object of my invention is, therefore, to provide an improved two-way plow.

Another object is to provide a combined two-way plow, lister and ridging device.

Another object is to provide an agricultural implement having a plurality of earth working tools borne thereby selectively moved to and from operative position.

Another object is to provide manual means selectively moving the plowing units of two-way plows to and from operative position.

Another object is to provide, in a two-way plow, a device restricting the plows to alternate soil engagement.

Another object is to provide, in two-way plows, mountings individual to plowing units thereof, providing adjustment of the lateral spacing and tilt of said plowing units.

Another object is to provide latch means individual to the plowing units.

Another object is to provide increased adaptability to varying requirements of two-way plows by incorporating in such plows improved adjustment features.

Further objects are to provide improved elements and arrangements thereof in a device of the character set forth that is durable, economical, dependable, and efficacious in operation.

In the drawings:

Fig. 3 is a rear elevation of the frame and mountings for the plowing units.

Fig. 4 is a section taken on line 4—4 of Fig. 3.

Fig. 5 is a section taken on line 5—5 of Fig. 4.

Fig. 6 is a plan view of the forward end portion of the plow beam and mounting plate as taken on line 6—6 of Fig. 3.

Figure 1:
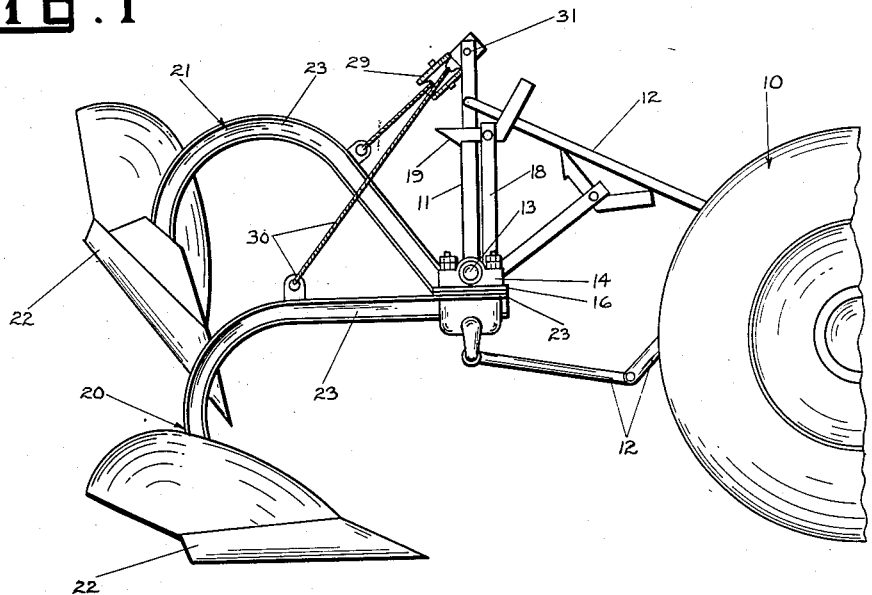
Fig. 1 is a side elevation of the two-way plow of the present invention shown in operative relation to a tractor.

Illustrative of a suitable traction vehicle, the rear of a tractor is indicated generally at 10 in Fig. 1. Rearwardly disposed on the tractor is a hydraulic lift to which the device of the present invention is suitably attached. The lift consists of a support frame 11, generally known as an A frame, and struts 12 elevationally positioning and supporting the A frame for operation. The struts are pivotally connected to the tractor and to the A frame. An hydraulic ram, not shown, is employed pivotally to raise and to lower the struts and thus elevationally to position the A frame. The lift exemplifies a conventional mounting for the two-way plow and thus is not described in greater detail. The invention is not limited to such a lift, but may be employed with any suitable vehicle providing suitable traction and elevational control.

A tool mounting shaft 13 is borne by the A frame substantially horizontally and transversely disposed to the normal direction of movement of the tractor and two-way plow. The mounting shaft is secured in position by clamps 14 embracing the outer end portions thereof. As shown in Figs. 3, 4, and 5, a pair of bearings 15 are journaled on the shaft in abutting relation. Secured to each bearing is a bracket plate 16. Elongated openings 17 are provided in each of the bracket plates, as shown in Fig. 4, having their longitudinal axes substantially parallel to the longitudinal axis of the mounting shaft 13. So mounted, the bracket plates are free to pivot on the mounting shaft and are constrained to constant lateral position thereon by the abutting of the bearings 15 with each other and with the clamps 14.

As will soon become apparent, it is desired to position the bracket plates rotationally relative to the mounting shaft and to maintain said bracket plates in adjusted position. To this end, control arms 18 are secured to the bearings 15 and their respective bracket plates 16, as by welding, and extended upwardly therefrom. Latch members 19, each having a rearwardly extended hooked portion overlying and engaging the A frame and a forwardly extended grip, are pivotally mounted on the upper end portion of the control arms. The hooked portion of the latch member is preferably beveled so that as the control arm approaches locking position the latch is raised by A frame engagement preliminary to dropping into locking position. Said hooked portions of the latch members are heavier than the grip portions so that they are gravitationally held in A frame engagement when in locked position. To unlock a control arm, the operator of the tractor pulls forward on the grip of the latch mounted thereon, resulting in the disengagement of the latch member from the A frame, and causing the control arm to swing forwardly and downwardly.

Figure 2:
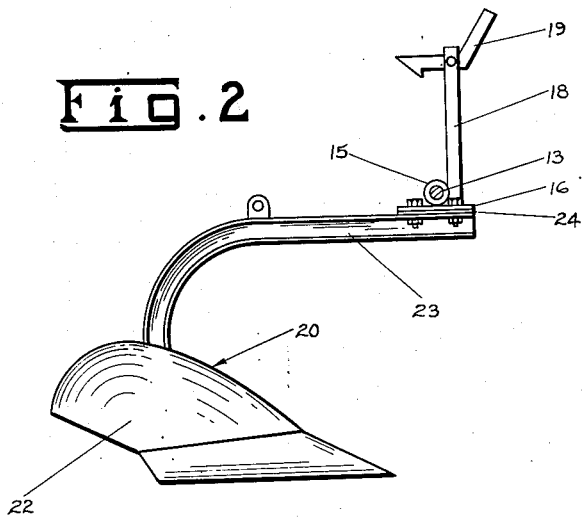
Fig. 2 is a side elevation of a single plowing unit of said device.

Referring again to Fig. 1, a right hand plowing unit is indicated generally at 20 and a left hand plowing unit at 21. As seen in greater detail in Fig. 2, each plowing unit comprises an earth working tool 22, commonly referred to as a plow bottom; a plow beam 23, mounting the plow bottom at its rearwardly disposed end portion; a bracket plate 13 and a bearing 15 already described, pivotally connecting the forward end portion of the plow beam to the lift by journaled engagement with the shaft 13; a control arm 18 extended from the bracket plate and bearing; and a latch member 19, already described, engaging the A frame to lock its respective plow beam and plow bottom down, in operative position. Adjustable control of the lateral spacing and tilt of the plowing units has been found advantageous in adapting the two-way plow to varied soil and plowing requirements. To the end of providing such adaptability, an adjustment means is interposed between each of the plow beams and its mounting. Mounting plates 24 are provided on the forward end portions of the plow beams 23. The mounting plates each have a plurality of mounting openings formed therein, as shown in Fig. 6. The mounting openings conveniently comprise a substantially circular opening 25, and kidney slots 26, adapted to receive securing bolts. Each plow beam is adjustably associated with its bearing and bracket plate by positioning the mounting plate in juxtaposed relation to said bracket plate 16 and inserting securing bolts through the opening 24 and the kidney slots 26, said bolts passing upwardly through the elongated openings 17 of the bracket plate and receiving nuts for tightening purposes. To tilt the mounting plates with reference to their bracket plates, spacing bolts 28 are screw threadedly engaged to said bracket plates and abut the mounting plates. The tilt is regulated by running the spacing bolts in or out of the bracket plate, as desired. The tilting of the mounting plates and their respective plow units by means of the spacing bolts 28 provides a means for adjusting the cutting angles of the plowing units in response to soil encountered and cultivating requirements. To adjust the lateral spacial relationship of the plowing units, the mounting bolts are loosened and slid longitudinally of the openings 17, as the plow beams are separated or drawn together. When said bolts are loosened, the plow beams may also be pivoted horizontally as permitted by the kidney slots 26.

At this point it is obvious that the positioning of the right and left hand plowing units in close proximity to each other causes the plow to operate as a lister for furrowing operations. When the positions of the plowing units are interchanged, said plowing units discharge the soil encountered inwardly and the two-way plow operates effectively as a ridging device.

In order to raise and lower the plowing units, selectively, by the manual manipulation of the latches and control arms, it has been found necessary to counterbalance the plowing units. This is conveniently accomplished by mounting a sheave 29 on the upwardly extended end portion of the A frame 11. A flexible tension member, such as a cable 30, is linked between the plow beams by way of the sheave 29. The sheave is preferably mounted on the A frame by a readily releasable means, such as a single sheave mounting bolt 31, which permits the optional employment of the sheave and cable. The limited length of the cable precludes both of the plowing units from engaging the soil simultaneously. Thus the weight of the elevated plowing unit as exerted through the cable 30 assists in lifting the lower plowing unit from the soil.

*Operation*

The plowing units are associated with their respective bracket plates and bearings 15, as described, proper attention being given to the special relationship of the plowing units and the tilts thereof. To employ the device of the present invention as a two-way plow the sheave is supported by the A frame as shown in Fig. 1. To transport the device of the preesnt invention the lift is elevated in the conventional manner. Prior to lowering the lift for operation, the plowing unit to be employed is depressed and its latch member 19 engaged with the A frame locking said plowing unit down in operative position. Subsequently the A frame is lowered for operation with the lower plowing unit in earth engagement.

To shift or alternate the plows, the hydraulic lift is employed to elevate the entire device clear of the ground. The operator of the tractor grips the latch member of the depressed plow and by pulling forward thereon unlocks the control arm 18, and with the weight of the other plowing unit being exerted in a lifting manner by the cable 30, the plowing unit that has been locked down is elevated clear of operative position. This raising permits the descent of the other plowing unit to operational position which in turn is maintained by the latch member's engagement with the A frame. Subsequently the A frame is lowered for operation.

To employ the present two-way plows as a lister, the sheave is disconnected from the A frame and both of the plowing units locked in operational position. To employ the plow as a ridger, the same condition is caused to exist, but the plowing units are oppositely arranged.

The two-way plow of the present invention has been found to be admirably suited to the purposes discussed and readily adjusted for various uses. The plows are conveniently and selectively moved to and from operative position by manual control exerted on the latch members. Lateral spacing is expeditiously accomplished. Tilting adjustment readily adapts the plowing units to particular soil and cultivating requirements.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and systems.

Having described my invention, what I claim as new and desire to secure by Letters Patent is:

1. In combination in a two-way earth-working implement: beams respectively carrying oppositely arranged earth-working tools adapted to be raised and lowered in synchronism; upstanding frame means upon which said beams are pivotally mounted to swing vertically as they are raised and lowered; means for supporting said frame means upon a tractor provided with a power lift for automatically raising and lowering said frame means, beams, and earth-working tools as a unit; normally upstanding control arms disposed in fixed angular relationship to the respective beams; latch means movably borne by upper portions of the respective control arms, each of said latch means having a hook portion and said frame means having a locking portion engageable by each hook portion for locking the respective control arm, beam, and tool in earth-working position; and an engageable portion on each of said latch means for engagement to actuate said latch means for lifting said hook portion from the respective locking portion of said frame means.

2. In combination in an earth-working implement: beam means carrying an earth-working tool adapted to be raised and lowered; upstanding frame means upon which said beam means is pivotally mounted to swing vertically as it is raised and lowered; means for supporting said frame means upon a tractor provided with a power lift for automatically raising and lowering said frame means, beam means, and earth-working tool as a unit; normally upstanding control arm means disposed in fixed angular relationship to the said beam means; latch means movably borne by an upper portion of said control arm means, said latch means having a hook portion and said frame means having a locking portion engageable by said hook portion for locking the said control arm means, beam means, and tool in earth-working position; and an engageable portion on said latch means for engagement to actuate said latch means for lifting said hook portion from said locking portion of said frame means.

JOHN C. MOOMAW.

REFERENCES CITED

The following references are of record in the file of this patent:

UNITED STATES PATENTS

| Number | Name | Date |
|---|---|---|
| 267,630 | Witt | Nov. 14, 1882 |
| 422,756 | Fields | Mar. 4, 1890 |
| 520,281 | Willard | May 22, 1894 |
| 880,724 | Davis | Mar. 3, 1908 |
| 992,714 | Graham | May 16, 1911 |
| 1,135,879 | Churchill | Apr. 13, 1915 |
| 1,303,427 | Wallace | May 13, 1919 |
| 1,318,036 | Wakefield | Oct. 7, 1919 |
| 1,363,755 | Reynolds | Dec. 28, 1920 |
| 1,420,108 | Kinney | June 20, 1922 |
| 1,420,576 | Reed | June 20, 1922 |
| 1,864,639 | Crezee | June 28, 1932 |
| 2,204,487 | Glorfield | June 11, 1940 |
| 2,354,084 | Geraldson | July 18, 1944 |
| 2,401,837 | Mellen et al. | June 11, 1946 |
| 2,423,894 | Lambert | July 15, 1947 |
| 2,424,192 | Rogers et al. | July 15, 1947 |
| 2,437,879 | Ferguson | Mar. 16, 1948 |
| 2,457,163 | Lansing | Dec. 28, 1948 |
| 2,529,809 | Mellen | Nov. 14, 1950 |